Oct. 15, 1968  M. BREITMEIER ET AL  3,405,883
APPARATUS FOR PRODUCING REELS OF FOIL OR STRIP MATERIAL
Filed June 20, 1966  2 Sheets-Sheet 1
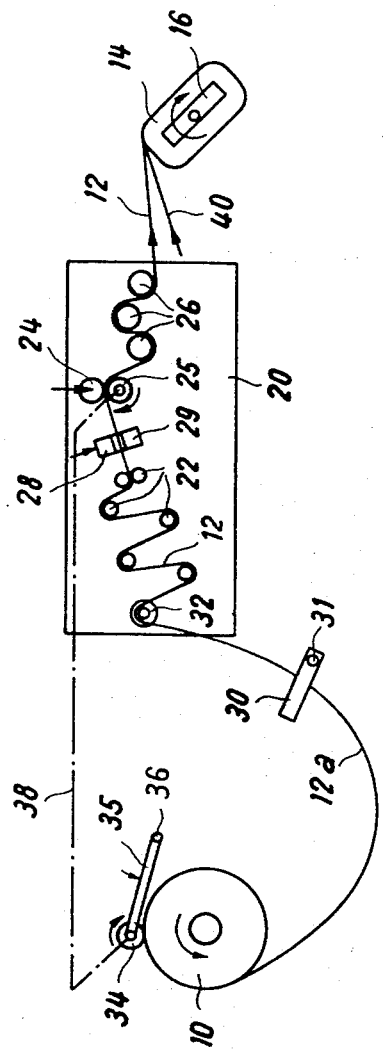
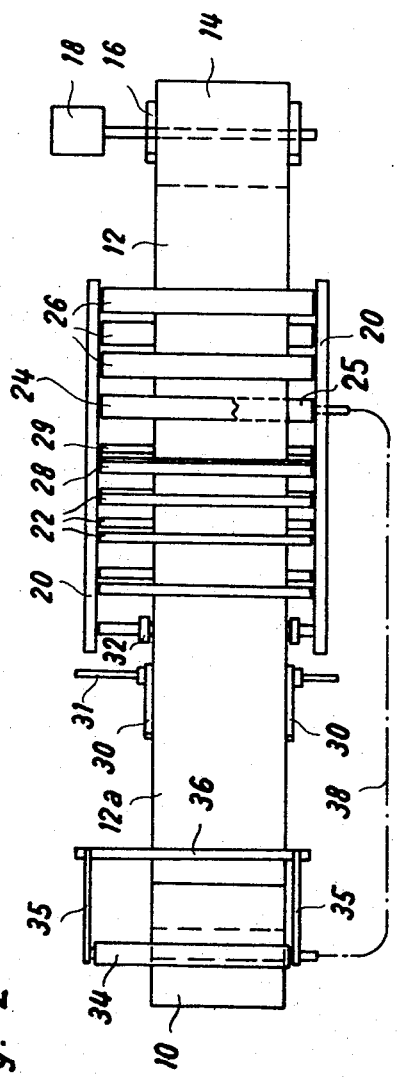

Oct. 15, 1968     M. BREITMEIER ET AL     3,405,883
APPARATUS FOR PRODUCING REELS OF FOIL OR STRIP MATERIAL

United States Patent Office 3,405,883
Patented Oct. 15, 1968

3,405,883
APPARATUS FOR PRODUCING REELS OF FOIL OR STRIP MATERIAL
Max Breitmeier, Todistrasse 62, Thalwil, Zurich, Switzerland
Filed June 20, 1966, Ser. No. 558,857
Claims priority, application Switzerland, June 25, 1965, 8,916/65
5 Claims. (Cl. 242—75.5)

ABSTRACT OF THE DISCLOSURE

An apparatus for producing reels of foil material wherein foil material from a supply roll is passed over a plurality of foil-deflecting rollers and then wound at a winding station. A freely hanging unloaded loop of the foil material is produced and maintained between the supply roll and the foil-deflecting rollers through the action of a mechanical and/or electrical connection between one of the foil-deflecting rollers and a drive means for the supply roll. The connection is such that the peripheral speed of the supply roll is controlled as a function of the rotation of said one foil-deflecting roller. Lateral guide means are provided for the foil material at the location of the freely hanging loop such that proper feeding of the foil material to the winding station is achieved without damaging the foil material itself.

---

The present invention has reference to an improved apparatus for the production of reels or packages of foil or strip material or the like, hereinafter merely conveniently referred to as foil material.

During production of reels or packages of foil material attention must be paid that such foil strip or band is always delivered exactly perpendicular to the winding axis, otherwise the continuously applied coils or windings of the package have the tendency to deviate more and more laterally. The cause of such lateral deviation of the coils is mainly due to the fact that the foil edges of the starting material do not extend exactly linearly, rather slightly wave-shaped over larger paths.

In the conventional winding devices in which the foil material or band is pulled from the supply roll by the driven winding mandrel over or through a roll frame— in other words, is under tension throughout the entire path—it is hardly possible to achieve a really effective lateral guiding since the edges of the foil band will be propped up and become damaged. Therefore, in order to obtain reels or packages with smooth end surfaces very high requirements are placed upon the linearity of the edges and the evenness of the starting material, which requires great care during production and thus brings about a relatively high price or cost.

These considerations are mainly applicable to metallic foil material or bands and to considerable degree to those formed of copper. But it is exactly with copper that the mentioned strict requirements are hard to fulfill at the semi-fabricated product owing to different processing operations (annealing and so forth), for which reason previously for instance the manufacture of transformer windings from copper foil or strip was associated with considerable difficulties.

Additional difficulties are encountered if reels of non-circular cross-section are to be produced, in that for instance winding is undertaken at a core or mandrel, the cross-section of which is a quadrilateral e.g. rectangle with markedly different lengths of the sides. The foil material during winding is then pulled along in jerks, which with certain constructions of winding machines and especially with heavy supply rolls causes impermissible tensile loads or permanent deformation of the foil material.

The present invention therefore has for one of its primary objects to provide an improved apparatus of the mentioned type which overcomes the drawbacks of the prior art.

Another more specific object of this invention concerns an improved apparatus for producing reels or packages of foil material which is wound up in such a manner that the individual coils of the foil lie exactly on top of one another and the winding proceeds without unduly stressing the material.

In order to implement these and still further objects of the invention which will become more apparent as the description proceeds, the invention generally relates to an apparatus for producing reels or packages from foil material, the latter passing from a supply roll through band-deflecting rollers to the winding station. Characteristic of the invention is the provision of drive means for the supply roll which are dependent upon one of the band-deflecting rollers placed into rotation by the foil material or band, in order to maintain between the supply roll and the band-deflecting rollers a loosely or freely hanging foil section.

Other features, objects and advantages of the invention will becomes apparent by reference to the following detailed description and drawings in which:

FIGURE 1 is a schematic side view of a first embodiment of inventive winding apparatus;

FIGURE 2 is a top plan view of the winding apparatus depicted in FIGURE 1;

Figure 3:
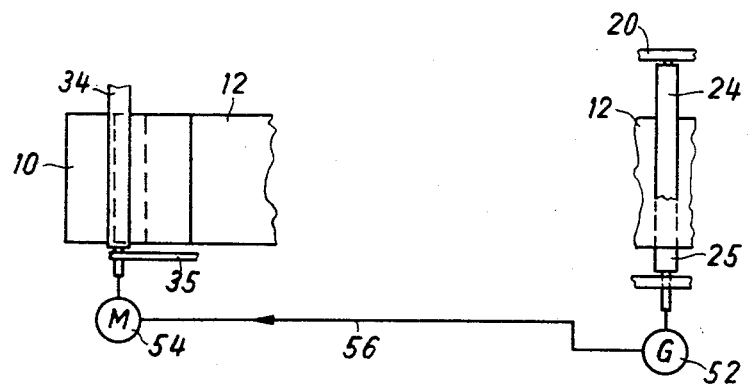
FIGURE 3 illustrates a variant of the drive for the supply roll for the apparatus arrangement of FIGURES 1 and 2.

Describing now the exemplary embodiment of winding apparatus depicted in FIGURES 1 and 2 it will be understood that the foil material or band 12 is payed off a supply roll 10 or the like mounted to be freely rotatable and travels through a roll frame 20 onto the package or reel 14 (workpiece) which is in the process of being formed. This package or reel 14 is wound up upon the mandrel or spindle body 16 placed into rotation by the schematically illustrated drive means 18.

At the roll or roller frame 20 the foil material or band 12 initially passes a set of guide rollers 22. Thereafter the foil strip or band 12 passes between a pair of strip boards 28, 29 which are provided with a felt covering and serve to strip foreign bodies adhering to such band. The contact pressure of these strip boards 28, 29 against the foil 12 is preferably adjustable in order to influence the foil tension at the package 14. Downstream of these strip boards 28, 29 in the direction of material travel there is arranged a pair of smoothing rollers 24, 25 which are pressed against one another and which smooth out any eventual appearing unevenness at the foil or at its edges. At the delivery end of the roller frame 20 the foil 12 passes a further set of guide rollers 26 before it arrives at the package 14.

In contradistinction to conventional winding devices in that of the present invention the foil 12 is not pulled by the package 14 directly from the supply roll 10 and maintained under tension until reaching such package, rather between said supply roll 10 and the point of entry of the foil into the roller frame 20 there is maintained a loosely hanging foil portion 12a. This permits the provision of guide means 30 laterally along this freely hanging foil section 12a which act laterally and are adjustable in relation to the width of the foil or band. Specifically, such guide means 30 are seated upon a transverse rod 31 and ensure that the foil 12 always enters the roller frame 20 in alignment with the package 14, even if its edges are not exactly linear, rather exhibit a certain curvature.

Owing to the fact that lateral guiding of the foil 12 takes place at the depending loop section 12a loading of the foil edges is at a minimum and no buckling or damage to the foil whatsoever occurs. It will also be recognized that laterally adjustable auxiliary guide means 32 can be provided at the first roller of the roller frame 20.

In order to maintain the hanging foil section 12a the supply roll 10 is continuously driven during the winding operation, and specifically in such a manner that its peripheral speed at least on the average corresponds to the feed velocity or speed of the band or foil, so that the depending loop 12a is neither "consumed" nor becomes unduly large. In this respect it should be observed that, while assuming a constant speed of rotation of the winding motor 18, the foil speed is not constant, rather increases owing to the increasing package diameter and moreover in the case of a rectangular package cross-section fluctuates jerkily.

An especially simple arrangement is possible if the drive of the supply roll 10 is tapped off one of the rollers 25 placed in rotation by the foil or band 12. For this purpose, and in the embodiment of FIGURES 1 and 2 there is provided a drive roll or roller 34 which for instance under appropriate spring loading (not shown) or due to only its own weight continuously bears against the periphery of the supply roll 10 in that such drive roll is connected by a pivot arm 35 to the shaft 36. The drive roll 34 is connected for rotation with one of the rollers entrained by the band, preferably the roller 25 as previously stated, and in the embodiment of FIGURES 1 and 2 such connecting means may be a flexible shaft 38 only schematically depicted with chain-dot lines in such figures. If the roller 34 is constructed to have the same diameter as the roller 25 then the previously mentioned requirement is fulfilled, and there is ensured for an approximately uniform throughpassage or hanging of the loose band section 12a.

In consideration of the jerky foil tension produced by the winding station a certain torsional elasticity of the flexible shaft 38 can be desirable. In any case owing to the continuous maintenance of the free band or foil section 12a of the band 12 the latter is relieved of the braking action and the inertia of the heavy supply roll 10. In the event that the foil material 12 withdrawn from the supply roll 10 should pass through a cleaning bath or the like then such a non-illustrated bath can be arranged to advantage at the region of the loosely depending foil section 12a.

Figure 4:
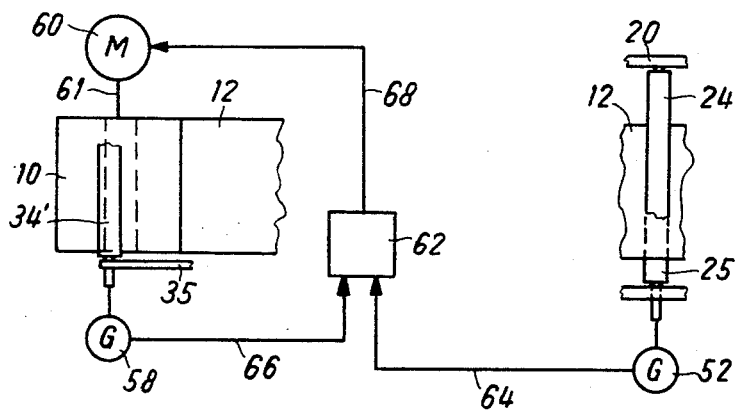
FIGURE 4 depicts a further variant of the supply roll drive for the inventive apparatus.

Two variants of a drive arrangement for the supply roll 10 dependent upon the foil-deflecting roller 25 are depicted in FIGURES 3 and 4. Since the drive arrangements are intended for use with the apparatus of FIGURES 1 and 2 only enough of the structure is shown in these FIGURES 3 and 4 as believed necessary towards understanding the essential components concerning the aforementioned drive. Moreover, it will be understood that the same reference characters have been used for like or analogous elements.

In the variant of FIGURE 3 an electric motor 54 is provided for driving the roller 34 bearing at the periphery of the supply roll 10. A tachometer (speed-indicating sender) or generator 52 is operatively connected with the roller 25 placed into rotation by the foil 12 and which generates an electrical signal dependent upon the travel of the foil. This signal is transmitted via the conductor or line 56 to the electric motor 54 so that such imparts to the supply roll 10 via the drive roller 34 a peripheral speed corresponding to the foil speed at the deflecting roller 25. Sender 52, motor 54 and conductor 56 collectively form a so-called electric shaft (Selsyn) for the transmission of synchronous rotational movements.

In the embodiment according to FIGURE 4 there is provided a roller or roll 34' contacting the supply roll 10. This roll 34' structurally can be similar to the roll 34 of the previous considered embodiments. In this case, however, such roll 34' does not serve for driving the supply roll 10, rather as feeler roll which is entrained by the supply roll 10 and placed into rotation. The roll 34' drives a sender 58 similar to the sender 52 at the shaft 25. Driving of the supply roll 10 is performed by a motor 60 seated at the roll shaft 61. The speed of the rotation of this motor 60 can be regulated whereby regulation takes place by a regulator or control 62 via its output conductor or lead 68. This regulator 62 receives as input signals the signal of the sender 52 via the conductor 64 and the signal of the sender 58 via the conductor 66. Speed regulatable motor 60 and regulator 62 form a servo drive mechanism with the generator 52 as reference value sender and the generator 58 as actual value sender. Every deviation between reference value and actual value, i.e. between the foil speed at the roller 25 and the peripheral speed of the supply roll 10, is determined at the regulator or control 62 as the difference of both input signals, and this regulator works such upon the drive motor 60 that the reference value is again made equal to the actual value.

With the described devices it is of course possible to produce multilayer windings in that together with the foil material 12 one or more further foils 40 (FIGURE 1) are also wound up. For these further or additional foils 40 corresponding, non-illustrated apparatus is provided as was for the foil material 12. For instance, with the foil material 12 such can be a conducting metal foil and the foil 40 one formed of insulating material. The apparatus has been found to be particularly suitable for the production of windings for special transformers for the production of windings for special transformers for the production of roll-type condensers.

While there is shown and described present preferred embodiments of the invention is to be distinctly understood that the invention is not limited thereto but may be otherwise variously embodied and practised within the scope of the following claims.

What is claimed is:

1. Apparatus for producing reels of foil material comprising a supply roll for delivering foil material, a winding station for winding up the foil material coming from the supply roll, foil-deflecting rollers over which the foil material passes during transit between said supply roll and said winding station, at least one of said foil-deflecting rollers being placed into rotation by the passing foil material, drive means for said supply roll, means operatively interconnected between said one deflecting roller and said drive means for maintaining a freely hanging loop at a portion of such foil material between said supply roll and said foil-deflecting rollers, said means for maintaining a freely hanging loop further including means for controlling the peripheral speed of said supply roll as a function of the rotation of said one foil-deflecting roller, and lateral guide means for said foil material situated at the region of said portion of said freely hanging foil material for laterally guiding said foil material.

2. Apparatus for producing reels as defined in claim 1, wherein said drive means comprises a drive roller continuously bearing against the periphery of said supply roll, said drive roller being connected to said one foil-deflecting roller for rotation by said means for controlling.

3. Apparatus for producing reels as defined in claim 2, wherein said means for controlling includes a flexible shaft arrangement, said one foil-deflecting roller and said drive roller possessing the same diameter.

4. Apparatus for producing reels as defined in claim 2, wherein said means for controlling the peripheral speed of said supply roll comprises an electrical connection incorporating a speed-indicating sender arranged at said one foil-deflecting roller and a speed-indicating receiver arranged at said drive roller.

5. Apparatus for producing reels as defined in claim 1, said drive means comprising a servo drive mechanism operably coupled with said supply roll, said means for controlling including a reference value indicator arranged at said one foil-deflecting roller, a feeler roll continuously bearing against said supply roll, an actual value indicator arranged at said feeler roll, said servo drive mechanism operating in dependency of said reference value indicator and said actual value indicator.

References Cited

UNITED STATES PATENTS

| | | | |
|---|---|---|---|
| 2,345,656 | 4/1944 | Calleson et al. | 242—78.7 X |
| 2,394,824 | 2/1946 | Todd | 242—78.7 X |
| 1,773,709 | 8/1930 | Daniels | 242—75.5 |
| 2,152,118 | 3/1939 | Walter et al. | 242—76 |
| 2,214,355 | 9/1940 | Tiselius et al. | 242—75.51 |
| 2,325,381 | 7/1943 | Edwards et al. | 242—75.51 |

FRANK J. COHEN, *Primary Examiner.*

NATHAN L. MINTZ, *Assistant Examiner.*